United States Patent [19]
Pocock

[11] Patent Number: 5,953,046
[45] Date of Patent: Sep. 14, 1999

[54] TELEVISION SYSTEM WITH MULTIPLE VIDEO PRESENTATIONS ON A SINGLE CHANNEL

[76] Inventor: Michael H. Pocock, 485 Queens Ave, London Ontario, Canada, N6B 1Y3

[21] Appl. No.: 08/251,247

[22] Filed: May 31, 1994

[51] Int. Cl.[6] ...................................................... H04N 7/00
[52] U.S. Cl. .............................. 348/12; 348/13; 348/385; 348/24
[58] Field of Search .................................... 348/6, 7, 8, 9, 348/10, 12, 13, 24, 559, 473, 385, 386, 387; H04N 7/08, 7/087, 7/173, 7/10, 7/22, 7/00

[56] References Cited

U.S. PATENT DOCUMENTS

| | | |
|---|---|---|
| 3,278,676 | 10/1966 | Becker . |
| 3,456,071 | 7/1969 | Jackson et al. .......................... 348/473 |
| 3,485,946 | 12/1969 | Jackson et al. ............................ 348/24 |
| 3,746,780 | 7/1973 | Stetten et al. . |
| 4,331,974 | 5/1982 | Cogswell et al. . |
| 4,521,806 | 6/1985 | Abraham . |
| 4,646,135 | 2/1987 | Eichelberger et al. . |
| 4,734,764 | 3/1988 | Pocock et al. . |
| 4,807,031 | 2/1989 | Broughton et al. . |
| 4,829,569 | 5/1989 | Seth-Smith et al. . |
| 4,849,817 | 7/1989 | Short ..................................... 348/385 |
| 4,924,303 | 5/1990 | Brandon et al. . |
| 5,014,125 | 5/1991 | Pocock et al. . |

FOREIGN PATENT DOCUMENTS 0034793  2/1991  Japan .

OTHER PUBLICATIONS

Channel Splitting Videotape—Cableshire—1990.

Cableshare—Canadian Press Release—May 14, 1990.

Primary Examiner—David E. Harvey

[57] ABSTRACT

A system for providing, in a television system, the combination, transmission, and reception of multiple video presentations over a single channel of a television distribution system. Presentations may be concurrently broadcast for viewing by many users, as well as interactively requested for display by many (potentially one thousand or more) individual users. A presentation consists of a sequence of images which reproduce a motion or still image video presentation for the user when displayed. The signal is transmitted in a standard television format, and consists of a sequence of video images from the various presentations being transmitted. A user terminal receiving the transmitted signal is selectably operable to display one of the multiple transmitted presentations with accompanying audio. The terminal identifies the video images on an associated television receiver. The number of concurrent presentations, and the degree of motion in the presentations are variable. User requested Interactive instructions between a user at the terminal end and the presentation system are transmitted by an associated telephone line or other communications link. A selected group of continuously transmitted interactive information can also be accessed without the use of a communications link.

38 Claims, 5 Drawing Sheets

TELEVISION SYSTEM WITH MULTIPLE VIDEO PRESENTATIONS ON A SINGLE CHANNEL

FIELD OF THE INVENTION

The present invention is generally directed to a television system which is capable of concurrently distributing multiple video presentations having different video information content over a single television channel for receipt by different respective viewers. For example, a television system in accordance with the present invention can distribute a broadcast video presentation as well as a plurality of interactive presentations from a central presentation system, to respective viewers with associated television set and terminal, by means of a single television channel.

BACKGROUND OF THE INVENTION

An interactive still frame television distribution system is disclosed, for example, in the U.S. Pat. No. 4,734,764 and U.S. Pat. No. 4,924,303. Such systems are particularly suited for interactive video services such as home shopping, financial transactions, education and the like. Generally speaking, in this type of system a viewer sends an indication to a central location describing a video presentation which he desires to receive, e.g. houses being offered for sale by a real estate service. Video frames which show the available houses are individually retrieved from a suitable video presentation which enables it to be retrieved from a suitable video storage medium, and each frame is labelled with an identification code which enables it to be retrieved by the viewer who desires to see it. Other viewers can independently request other presentations available on the system. All of the frames selected by the various viewers are multiplexed onto a transmission medium, such as the trunk cable of a cable television system, and transmitted at the standard television frame rate, e.g. 30 frames per second under the NTSC standard, over a channel associated with the video presentation service. Frame stores are positioned at various locations along the length of the transmission medium, and each is provided with a match code, for example an address. When a video frame is labelled with the match code of a particular frame store, that frame store identifies the frame, stores it in a memory, and then continually retransmits the stored frame at the standard television frame rate to the viewer's television receiver. The continually transmitted frame appears as a still frame on the viewers's television receiver. When the next frame in the presentation is required, this frame is retrieved, labelled with the appropriate code, and transmitted to the frame store for display in the same manner. This process is repeated for all the frames in the still-frame presentation.

A sequence of frames may be sent for each still-frame presentation. If still frames are delivered at sufficient rate, the presentation takes on the appearance of reduced motion rather than distinct still frames. For example, if frames are sent at a rate of 6 per second, 5 concurrent user presentations are possible over a single television channel (having 30 frames per second capacity) with reduced motion. Additional processing within the frame store unit can interpolate several images to display additional images, with the object of producing the appearance of smoother motion.

With the increasing acceptance of the value of interactive television services, there is a clear benefit to the industry to provide an efficient transmission medium for these services. The interactive television systems as disclosed in the U.S. Pat. No. 4,734,764 and U.S. Pat. No. 4,924,303 require a dedicated television channel to offer interactive services. The high cost of dedicating a television channel solely to an interactive service is viable only for the largest of such services. The present invention enables interactive services to begin with a small amount of channel capacity at a fraction of the channel costs.

Additionally, many television telecasters such as cable, direct broadcast satellite (DBS) and wireless cable companies have reached the limit of their channel capacity and are unable to meet the demand of the proliferation of new programming sources. The result is that interactive service providers are unable to acquire the "full" channel required to offer their services. The present invention enables the sharing of channel capacity enabling an interactive medium for broadcasters and information providers. Furthermore, it is highly desirable to include interactive capabilities with many of these broadcast services. As an example, a Public Broadcast Service (PBS) educational video broadcast could simultaneously support a plurality of viewer requested interactive video presentations for example testing and additional information on a particular subject reviewed in the broadcast. Combining these applications onto one channel would save the cost of an additional channel while providing the benefits of interactivity.

Accordingly, it is an object of the present invention to provide a television system which expands the program capacity of each channel of the television system by distributing at least two distinct presentations concurrently on a single channel. It is a further object of the present invention to address the above-mentioned needs by providing a television system which is capable of distributing multiple interactive and broadcast video presentations, to different respective viewers by means of a single television channel, including the combination of full motion, reduced motion and still-frame video presentations. It is a further object of the present invention that the combination of presentations be dynamically variable so that the system can respond to changing presentation requests over time.

SUMMARY OF THE INVENTION

The present invention provides a television system which increases the capacity of television channels by exploiting the fact that certain presentations do not require the full image capacity of a dedicated television channel and therefore the excess capacity can be used to distribute images of additional presentations over that channel. A television signal having multiple video presentations is transmitted over a single television channel. In an exemplary embodiment of the invention, one video presentation could comprise a motion video program and other presentations could pertain to still-frame interactive video services. The television signal is produced by a multiplexer which combines the still-frame interactive video images and motion video images into a standard (such as NTSC) sequence of images for transmission.

In one embodiment of the invention, each of the interactive video images has an identification associated therewith so that these images can be distinguished from the full motion video images, which have a distinct associated identification. A user terminal which receives the transmitted television signal can be selectably operable to display different presentations. A selection corresponds to one of the video presentations transmitted in the television signal, and causes a television receiver connected thereto to display only the corresponding video presentation. In the specific example described above, the terminal can display either the motion presentation or a still-frame interactive presentation. To display a selected television signal corresponding to the associated selected presentation, the terminal identifies the video images of the presentation, stores the selected images, and displays them on an associated television set. Other applications of the invention are also possible. The television signal could combine two or more motion video presentations wherein the content is such that each presentation can be displayed at less than the standard television rate without significant quality loss to the viewer. For example, a movie broadcast could be allocated more or less fields depending on many factors as an example, the number of interactive fields to be transmitted, the motion quality or combination of the above. In the case of an educational program containing a "talking head" the video broadcast could be reduced to 15 fields per second leaving the remaining 45 fields for interactive presentations.

The interactive information to be combined with the motion broadcast can be user activated wherein user requested interactive instructions between a user at the terminal end and the presentation system are carried out via the use of a communication link such as a telephone line. Interactive information is requested by the user at the terminal end using a keypad device such as a wireless infrared remote control, computer keyboard, or telephone keypad. A further extension of the invention provides for the storage of the motion programming on the interactive system whereby the user controls the broadcast of the motion programming through the communications link.

A second method of interactive operation is disclosed whereby interactive images are multiplexed with the broadcast video presentation and continuously transmitted as a plurality of images to all remote terminals. This group of preselected interactive images is referred to as a carousel of images and is similar to the carousel concept employed in teletext based systems. The present invention discloses the transmission of video image(s) rather than teletext graphics and text although the present invention could also transmit video images of teletext generated graphics and text. This second method of interactive operation utilizes the same keypad device as previously described but does not require a communications link to the interactive presentation system as disclosed with user requested interactive presentations.

The invention extends to a digital as well as analog (such as NTSC) transmission format where images or sequence of images are labelled with an identifier. Under a digital television format, additional digital processing such as image compression permits even greater dynamic variation in the trade-off between image transmission rate, image resolution and degree of compression.

With a digital format, broadcast video presentations could be stored on the interactive video presentation system and telecast based on a predetermined schedule or activated and controlled by a user at the terminal end.

The foregoing features of the invention, as well as the advantages provided thereby, are explained in greater detail hereinafter with reference to preferred embodiments illustrated in the accompanying drawings.

DETAILED DESCRIPTION OF THE ILLUSTRATED EMBODIMENTS

Figure 1:
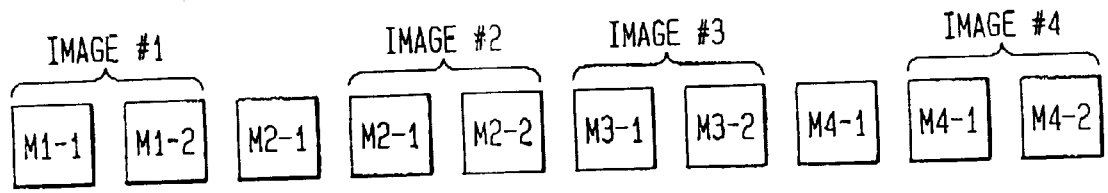
FIG. 1 illustrates a specific example of a sequence of image frames with certain fields being repeated to provide a full motion video sequence.

The present invention achieves increased capacity for a television channel by producing a television signal having video images from at least two distinct video presentations incorporated into a signal transmitted over a single television channel. As used herein, the term "video presentation" is employed to identify video image sequences which correspond to motion television presentations as well as still-frame video presentations. In its transmitted form, the video presentation could comprise an analog video signal or digitally encoded video data. Furthermore, the encoded video data could be in a digitally compressed format.

A standard television signal is comprised of multiple successive images. When the television signal is transmitted in an analog form, each image is called a frame. Under the NTSC standard, for example, video images are transmitted to a standard television receiver at a rate of 30 image frames per second. A single image frame presents a video-quality still image. Each image frame actually consists of two image fields which are interleaved to increase the vertical resolution while reducing flicker in the displayed picture. The image field rate is therefore 60 fields per second. The two interleaved fields are comprised of a plurality of scan lines referred to as the vertical blanking interval (VBI) and a larger plurality of scan lines containing the video signal to be converted to a video image on the television screen.

When the television signal is transmitted in a digital format, each image is sent in a data block that corresponds to one field or frame. Digitally transmitted image data typically does not include a 'vertical blanking interval' as in the analog standards. However, each data block would typically include a header record to identify that image. In a compressed digital video signal, the image rate may be substantially higher than the analog rate of 60 image fields per second. For example, current technology can digitally compress a still video field into 10 kbytes of data, and provide a digital transmission capacity of 20 Mbps (2.5 Mbytes/s) in an NTSC channel. Thus, 250 images may be transmitted every second on a single television channel. This capacity is sufficient to carry various combinations of still and motion presentations. For example, 250 images per second is sufficient to carry 4 full-motion programs on a single channel or support 2,500 interactive viewers requesting still frames every 10 seconds. The present invention provides for various combinations of still and motion presentations. For example, a combination could entail one full-motion broadcast video presentation of 60 fields per second combined with 190 images per second of interactive images whereby the 190 images could be assigned such that 20 images per second could be allocated to the image carousel while the remaining 170 images per second could be dedicated to user requested interactive presentations relating to 1,700 users with an average of 10 seconds between images. The number of images dedicated to the to each of the interactive services and video presentation is dynamic. For example, the number of images allocated to the carousel can increase or decrease according to the number of user requested presentations. Technology advances are anticipated to increase channel capacity and reduce compressed image sizes, resulting in higher image rates within the transmission channel.

The television system of the present invention has the capability to transmit a signal over a single television channel having images that are respectively associated with at least two distinct video presentations. For example, the transmitted signal may comprise a sequence of images wherein every other image is associated with a first broadcast video presentation and the remainder are associated with a interactive video presentations. This concept will be further explained with reference to a specific example illustrated in FIGS. 1, 2A and 2B. To facilitate an understanding, this particular example pertains to an analog video signal comprised of image frames.

Certain types of full motion presentations, such as movies, consist of 24 image frames per second. To convert a movie to a video signal for transmission and display in a typical television system, the 24 image frames are expanded to 30 image frames by the repetition of 1 video field for every 2 images as illustrated by way of example in FIG. 1. As shown in FIG. 1, a sequence of image frames corresponding to image 1, image 2, image 3, and image 4 are transmitted. Each image frame comprises two distinct fields as previously noted, e.g. image 1 includes a first field M1-1 and a second field M1-2. The actual conversion from 24 to 30 image frames per second is illustrated by the repetition of a field of image 1 and M1-3 and a field of 3 as M3-3. Preferably, the first field is repeated to maintain full vertical resolution. The repeated field contains the same information as the previously transmitted field. In accordance with the present invention, this particular attribute can be utilized to increase the capacity of existing channels.

Figure 2A:
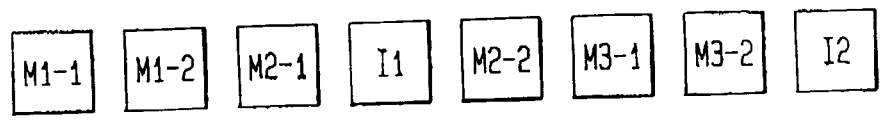
FIGS. 2A and 2B respectively illustrate a transmitted combined image sequence and a reconstructed motion video sequence.
Figure 2B:
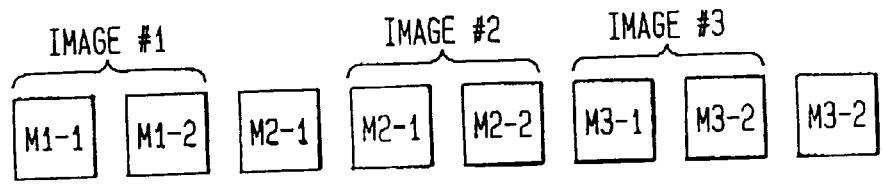

More particularly, the present invention effectively creates a multiplexed channel by transmitting new fields in the time slots which would normally contain a repeated field in this example. FIG. 2A illustrates a video image sequence wherein fields 3 and 8 are replaced with interactive fields I1 and I2 rather than being repeated fields of the movie. At the user's end, when it is desired to view the movie, the interactive fields I1 and I2 are removed from the video signal and the appropriate previously sent field of the video signal is repeated. FIG. 2B illustrates a reconstructed video image sequence, at the users end, which corresponds to a full motion video movie sequence. Interactive fields I1 and I2 have been effectively replaced by the repetition of fields M1-1 and M3-1 and M1-3 and M3-3 respectively, at the user's end. This process reproduces the desired video image sequence with no loss of quality. (In the case where the repeated field is the second field of the image, there will be a slight loss of vertical resolution on the repeated field).

Alternatively, if the user desires to access the interactive service, only the fields I1 and/or I2 is selectively retrieved from the video signal for display on the viewer's receiver. Each retrieved interactive field is continuously displayed on the viewer's receiver at the standard television frame rate, to provide a still frame, until the next interactive field of the presentation is received.

It can therefore be appreciated that in the example described above, the present invention effectively doubles the capacity of a single channel to include the concurrent transmission of, for example, 24 image frames (48 fields) per second which can be utilized for the distribution of a movie, and 12 image fields per second which can be used for an interactive service. Reduced vertical resolution can be alleviated by the terminal with vertical interpolation stored lines of the first field to generate the second field of a frame.

Figure 3:
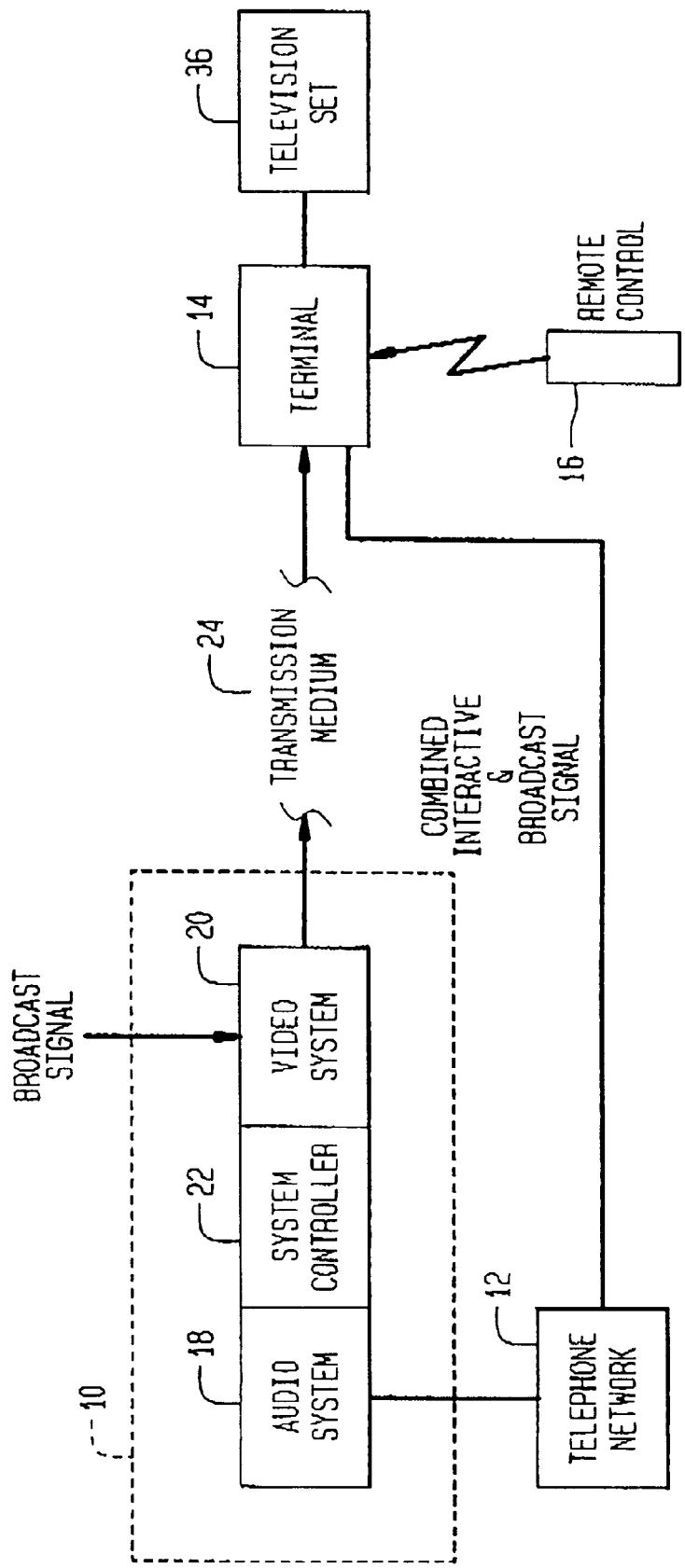
FIG. 3 is a block diagram of an interactive television system which operates according to the principles of the present invention.

Referring now to FIG. 3, an overall system diagram of a television system combining broadcast and interactive television services is illustrated. When an interactive presentation is requested, according to the present invention, the viewer sends instructions to a presentation system 10 at a central location to identify one or more presentations that are desired to be viewed. These instructions are transmitted from the viewer's remote location to the central location by means of a wire, fibre optics, cellular, radio or other telephone network 12. For example, the instructions might be transmitted as touch tones which the user generates by depressing buttons of the keypad on his telephone set. More preferably, however, the instructions are generated within a user terminal 14 located at the viewer's home, and transmitted over the telephone network as DTMF or modem tones on an analog line, or data on a digital line such as the ISDN format. For ease of use, the terminal 14 is preferably controlled by means of a remote control unit 16 which transmits instructions to the terminal 14 via infrared signals.

The presentation system 10 processes the incoming requests from the viewers and retrieves video images and accompanying audio associated with the presentations desired by the various viewers. In one embodiment of the invention, each image is labelled with a corresponding identification. For example, the identification might indicate the particular video presentation to which it pertains, or it may be an address identifying the viewer for whom it is intended. All of the selected video images are assembled into a video signal that is transmitted to the viewers.

The presentation system 10 basically comprises three main subsystems, an audio subsystem 18, a video subsystem 20 and system controller 22. The servicing of the incoming requests received by the audio subsystem and assembly of requested images into a video signal by the three subsystems is carried out under the management of the system controller 22. Once the various requested images have been assembled into a video signal, this signal is transmitted over a suitable transmission medium 24, such as a CATV system, a terrestrial or satellite broadcast network, or a fibre optic network.

In operation, the terminal 14 selectively stores video images and continuously displays them on to the television set 36. When a viewer activates the terminal 14 to view an interactive presentation, the user terminal 14 is tuned to a television channel associated with the interactive presentation images, e.g. channel 33. The terminal has a code relating to the identification label in the images pertaining to the interactive presentation the viewer desires to see. The user terminal examines the images transmitted over the appropriate channel for those which are labelled with the proper identification, and stores each such image, one at a time, in a memory (not shown). The stored image is continually retransmitted from the terminal 14 to the viewer's television receiver 36 for display as a still image. When the next image in a desired video presentation reaches the user terminal, it replaces the preceding image in the memory and is then displayed.

The presentation system 10 is also operable in a non-interactive display mode. The terminal will store and retransmit only the broadcast video images to the television set 36 in accordance with the process discussed with reference to FIGS. 2A and 2B. When the terminal is operating in the non-interactive mode, it need not be connected to the presentation system 10 via the telephone network 12.

Figure 4:
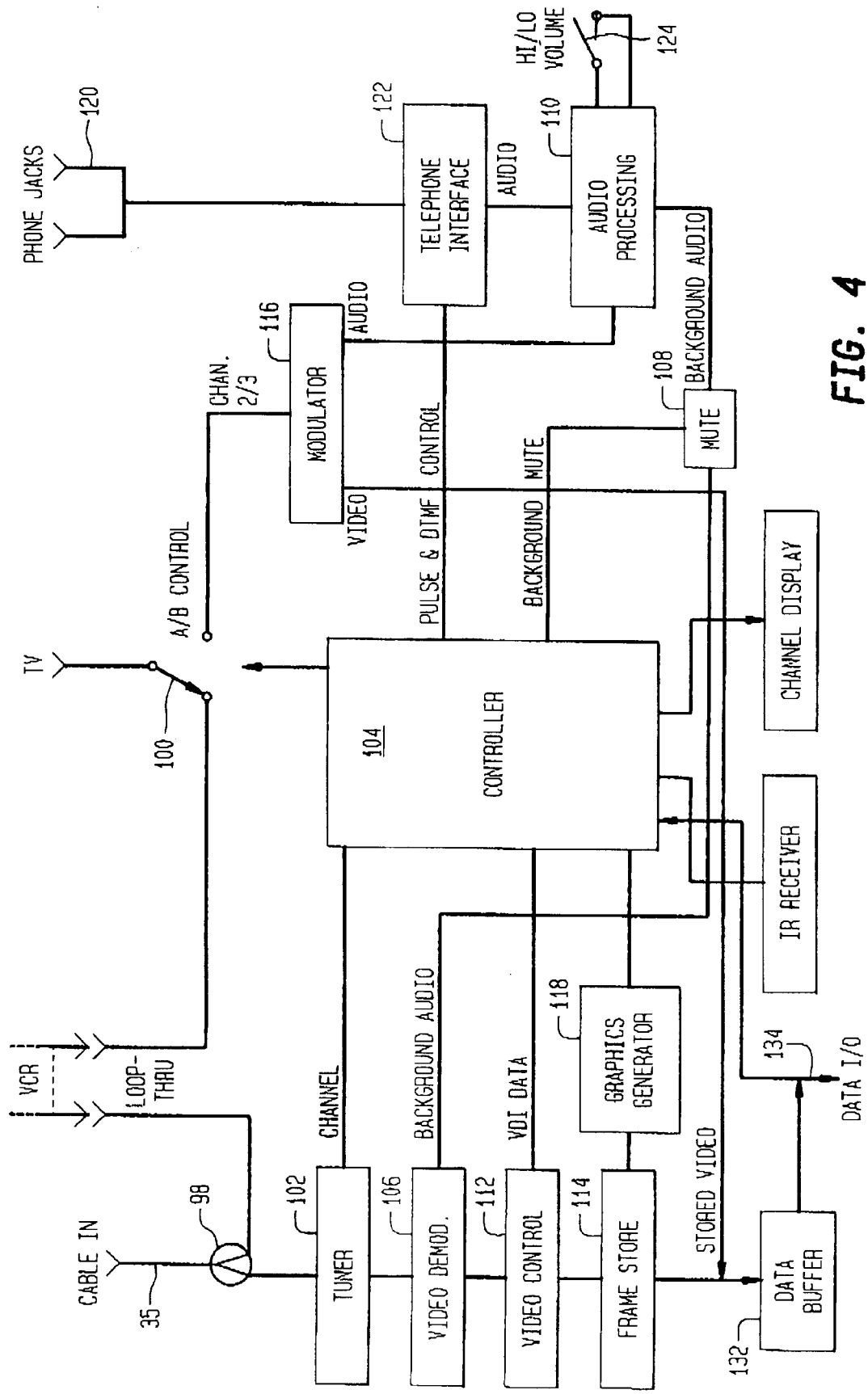
FIG. 4 is a detailed block diagram of the terminal utilized at the user's end according to the present invention.

The structure of the user terminal 14 is illustrated in FIG. 4. Referring thereto, the input line to the viewer's home, such as an antenna or a drop cable 35, is connected to a signal splitter 98. One output terminal of the splitter is connected to any user accessories, such as a video cassette recorder, and then to the viewer's television receiver by means of a control switch 100. During normal viewing, the control switch 100 is in the position shown in FIG. 4, where the television is directly connected to the input line.

The other output terminal of the splitter 98 is connected to a channel tuner 102. This tuner is adjusted to a particular television channel that carries two or more video presentations, e.g. channel 33. The adjustment of the tuner to this channel is carried out by means of a control signal from a controller 104.

The tuner passes only the signal on the designated channel to which it is currently tuned. This signal comprises the sequence of encoded video image fields or frames assembled in the presentation system 10 as well as any background audio signal that has been combined with the video signal. The signal carried on the designated channel is applied to a video demodulator 106, which separates the background audio signal from the video information. The background audio signal is applied to the muting circuit 108 selectively blocks the background audio signal or passes it along to an audio processing circuit 110.

The video information from the video demodulator 106 is presented to a video control circuit 112. This control circuit is supplied with data from the controller 104. In part, this data contains the identification code of the images that pertain to the video presentation the viewer desires to see. In response to this data, the video control circuit detects information which is labelled in the vertical blanking interval of each image and determines whether any image carries the specific identification code supplied by the controller 104. If the identification code is detected in the vertical blanking interval of an image, the image is gated to an image store 114. For some applications, it is also useful to optionally store images which have not been labelled. The video image stored within the image store 114 is continually read out of the image store and applied to a modulator 116 at the standard television image rate. If locally generated graphics are to be displayed with image, for example as part of an interactive service, they are generated in a graphics generator 118 under instructions from the controller 104, and displayed with the image stored in the image store 114.

The user terminal includes telephone jacks 120 and telephone interface 122 for the receipt and transmission of additional interactive information transmitted over the telephone lines. The audio processing circuit can be provided with a volume control switch 124 to enable the viewer to control the level of the background audio relative to the telephone audio signal, as well as control of the overall volume level. If the user terminal is to be located at a place where it is not convenient to connect it to a telephone line, the telephone jacks 120 can be replaced with a wireless transmission system similar to that employed in cordless (or radio) telephone.

When the user desires to view a selected presentation, he enters appropriate commands into the controller 104. Those commands can be entered by depressing appropriate alphanumeric keys on the remote control unit 16, which sends corresponding infrared signals to the user terminal. These signals are received in an infrared receiver 126 and forwarded to the controller. The controller actuates the control switch 100 to connect the television receiver to the modulator 116. In addition, it provides the video control circuit 112 with the appropriate identification code associated with that presentation. In this condition, the receiver then reproduces the video presentation selected by the viewer. The appropriate identification code may also be provided from memory within the terminal, or from the presentation system sending commands to the terminal.

Figure 5:
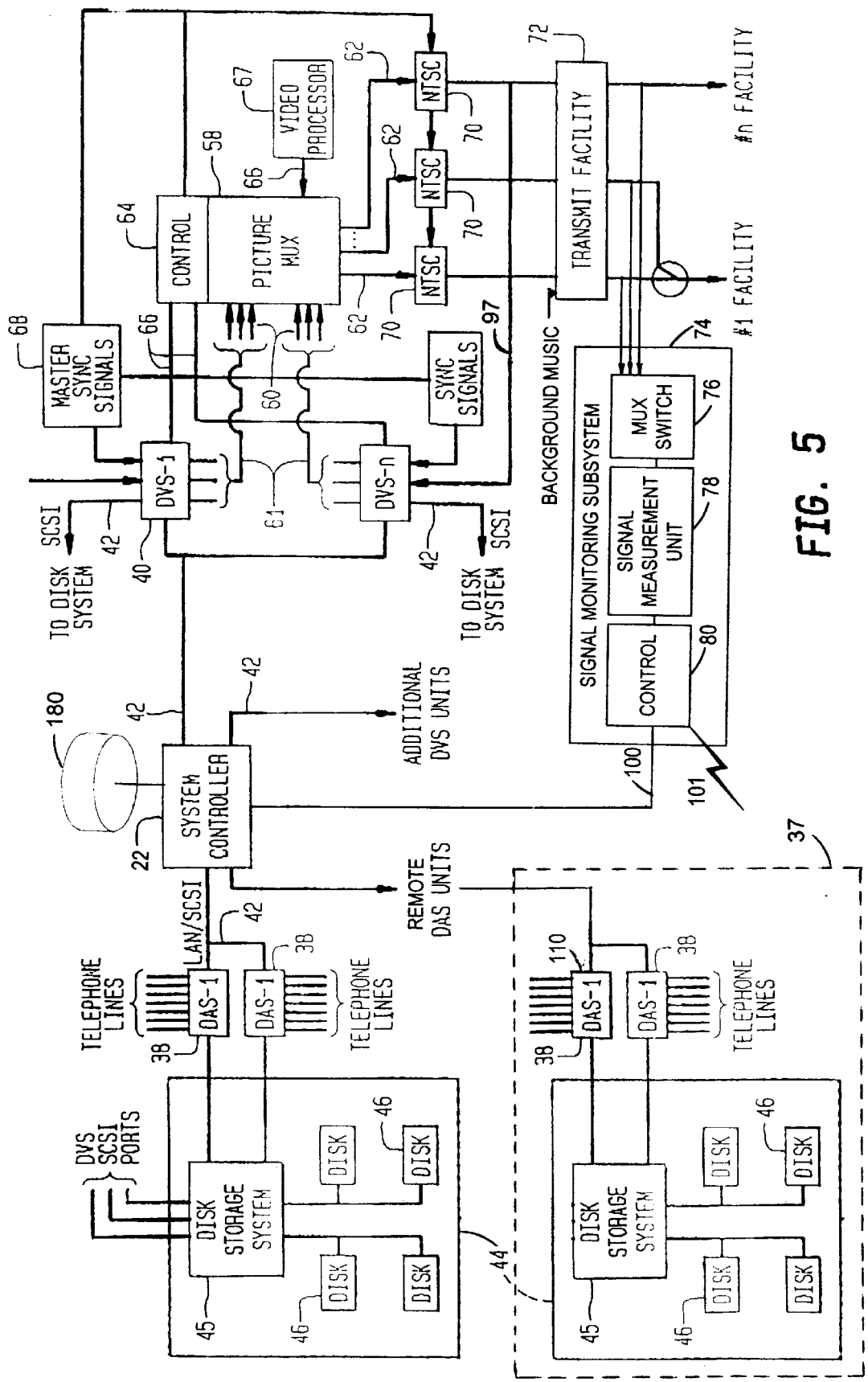
FIG. 5 is a more detailed block diagram of the presentation system in the interactive television system.

A more detailed block diagram of the presentation system 10 is illustrated in FIG. 5. The audio subsystem comprises a number of DAS (Digital Audio System) control units 38, and the video subsystem includes a number of DVS (Digital Video System) control units 40. Each of the centralized control units 38 and 40 communicates with the system controller 22 by means of a local area network (LAN), for example a SCSI bus 42. The control units also communicate with a disk storage system 44 by means of the LAN.

The disk storage system 44 stores digitized information for the various video presentations that are available by means of the interactive service. The disk storage system 44 also stores the audio for callers serviced by that interactive presentation system.

The remote audio subsystem 37 consists of a DAS control unit 110 and disk storage system 111. The remote DAS configurations are located in geographic areas remote from the central interactive presentation system and are located strategically to reduce or negate long distance telephone charges associated with user requested interactive presentations initiated from outside the local calling area of the central interactive presentation system. The remote audio subsystem 37 stores the same audio files as the central disk storage system 44.

Preferably, the digitized audio and video information is stored in a compressed form. As illustrated in FIG. 5, at the central location a single disk storage system 44 is shared by all of the DAS control units 40. If desired, however, separate disk storage systems could be respectively associated with the audio subsystem and the video subsystem.

The disk storage system 44 includes a multiported controller 45 having a number of ports respectively connected to the DAS and DVS control units. The controller 45 also has a number of ports respectively connected to a plurality of disk drives 46. The controller receives disk control commands, such as read and write data for example, from the DAS and DVS control units via the LAN, and sends stored data from the disks to the control units.

The remote audio subsystem 37 connects to the system controller 22 via a communications line 109 for example a leased data communications facility or telephone line. The remote audio subsystem communicates with the central system controller 22 whereby read and write instructions activate the stored digital data relating to the video segment (s) to be communicated to the to the DVS 40. The video is thereby transmitted, from the central site, in sequence with the audio originating from the remote audio subsystem.

Each of the DVS control units 40 receives compressed, digitized video information stored in the disk storage system 44, expands it and converts it into a video signal. In addition, the DVS control units insert appropriate identification and control information into the vertical blanking interval of each image to be transmitted. The DVS control unit can also insert text which is to be overlaid upon a selected image. Once the video image has been composed within the DVS control unit, it is supplied to a picture multiplexer 58.

The picture multiplexer 58 has video input ports 60 which receive the video signals from the DVS control units 40 over video lines 61. The multiplexer has multiple output ports 62 corresponding to the number of transmission paths. Preferably, each of the input and output ports comprises an RGB video port. The picture multiplexer 58 also includes input ports 66 to accept full motion video from video processors 67 which in turn receives transmissions from video sources.

Associated with the picture multiplexer 58 is a controller 64 containing a command/status register for each DVS control unit 40. The DVS control units communicate with the controller 64 over control lines 66 to provide information which identifies the transmission path for the video image from that control unit, an indication of whether the image is to be transmitted in a field or frame format, and the input port number where the image appears. This information is written into the command/status register associated with the DVS control unit.

The controller 64 arbitrates among all of the input ports to which a video signal has been presented for transmission. Each such input port is serviced by selecting an output port based upon the identification of the transmission path in the command register, and activating an electronic switch within the multiplexer 58 to gate the input port to the selected output port at the start of the vertical interval of the next field. In this regard, master timing information for synchronizing the transmission of all of the video frames at the respective input ports is provided by a master sync signal generator 68. This generator produces horizontal and vertical interval pulse signals which are supplied to the controller 64 for the picture multiplexer and to each of the DVS control units 40. These pulses are used to control the timing with which video frames are presented to the input ports of the picture multiplexer and switched to its output ports to thereby ensure that a continuous, synchronized video signal appears at each output port at a standard television frame rate, e.g. 30 frames per second in the NTSC format.

Once the transmission of a video image (field or frame) has been completed, the controller returns an appropriate status in the command/status register for the DVS control unit from which the image originated, to thereby provide an indication that the multiplexer is ready to receive the next image from the DVS control unit.

The video signals present at the output ports of the picture multiplexer 58, which are preferably in RGB format, are applied to respective NTSC composite video encoders 70. Each of these encoders receives synchronizing signals from the master signal generator 68, including a reference color subcarrier, as well as horizontal and video synchronizing signals. The RGB video signals are converted to NTSC composite video signals. The RGB video signals are converted to NTSC composite video signals, and applied to a transmission facility 72. The transmission facility 72 has n+1 audio channels, where 'n' is the motion presentation capacity. Audio channels may be on distinct carrier frequencies using analog or digital modulation, or they could use blocks of addressed audio data in the same or another transmission channel as digital video images. There are N audio channels provided so there can be one audio channel corresponding to each of the broadcast motion presentations and one channel which receives background music that is to accompany the interactive video presentations. Foreground audio for user requested interactive presentations utilizes the telephone link. The output signals from the transmission facility 72 are then disseminated to the viewers. This facility can be a coaxial or fibre optic cable, a broadcast transmitter, or a microwave channel for distribution to individual receivers, a CATV hub or a satellite for DBS broadcasts.

Thus, in the example described with reference to FIGS. 1, 2A and 2B, a signal transmitted from the presentation system 10 contains the 48 full motion video image fields per second plus the 12 interactive fields on a single television channel. This combined television signal appears at the output of the picture multiplexer 58 at the rate of 30 frames, or 60 fields, per second complete with an identification label in the vertical blanking interval of each image (frame or field).

Figure 6:
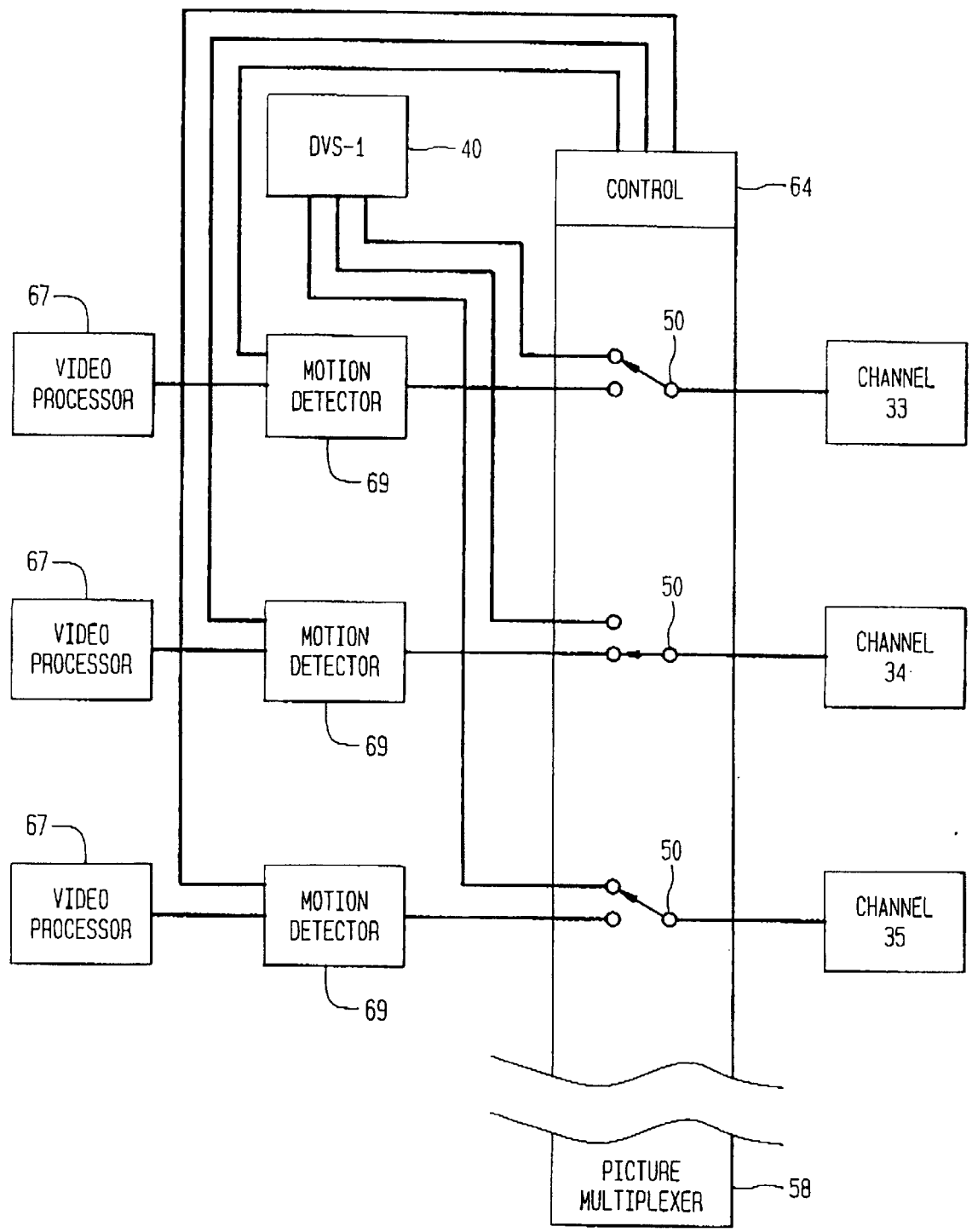
FIG. 6 is a more detailed block diagram of the picture multiplexer and associated hardware according to the present invention.

Referring briefly to FIG. 6, the process of combining broadcast video images with the interactive images will be described. In the illustrated embodiments, the full motion broadcast video images are supplied to the picture multiplexer 58 from the video processor 67, which in turn receives program signals from suitable video sources. The interactive images (still frame or motion) are supplied from the DVS control units 40, comprises the interactive video presentations of the system described with reference to FIG. 5. The picture multiplexer 58 comprises a plurality of switches 50 which are operated in response to signals from the controller 64. The switches 50 intermittently switch from the port associated with video processor 67 to a port associated with one of the DVS control units 40 to interleave the broadcast and interactive images and produce a sequence of images to be passed to each channel, in this example of incorporating interactive fields into the image fields of a movie presentation, the controller 64 operates the switch 50 in such a manner that 12 interactive fields are interleaved with the 48 fields associated with the movie presentation to produce a television signal at the rate of 60 image fields per second on one of the associated channels.

In addition, motion detectors 69 may be associated with each of the video processors 67. The motion detectors 69 can be of the conventional video motion detector type wherein subsequent video images are compared with previous video images to determine if there is a significant motion or movement during the sequence of video images are compared with previous video images to determine if there is significant motion or movement during the sequence of video images. Such a detection is helpful in situations where the broadcast video frames from the video processor 67 lack a significant amount of motion. In such a situation, certain of these broadcast video fields may be replaced without losing the quality of the video presentation so that additional interactive fields can be interleaved on that particular signal being transmitted over one of the channels of the television system. As an example, in the event that the broadcast video presentation contains portions where there is no or relatively little motion, such as one person speaking or a stationary object, the motion detector 69 associated with that broadcast video would signal the controller 64 that an opportunity exists to incorporate additional interactive fields from a DVS control unit 40 which is the source of the next interactive field. In effect, the motion detectors 69 will act as a trigger for switch 50 to connect the interactive fields to the television signal during periods of relatively little motion in the broadcast video.

When the terminal 14 at the user's end is displaying a broadcast presentation, the terminal 14 will examine the incoming identification code of each image. If the identification code matches, the signal is allowed to pass through the terminal 14 to the television set 36. In the terminal 14 the image store 114 carries out read and write operations concurrently, so that sequential fields of the broadcast program are only stored momentarily. When no identification code match occurs, the currently stored field is repeatedly displayed until the next broadcast video field replaces it.

The interactive service operation is similar to that previously described with respect to FIGS. 3, 4 and 5, when displaying an interactive presentation, the terminal 14 ignores the other video fields and only stores and displays the interactive selected presentation fields transmitted over the particular channel of interest.

The above-described embodiment of the present invention is only exemplary of the capabilities provided by the invention for increasing the capacity of one or more channels in the television system. The television system may be adapted to produce varying video image rates such as 30 fields per second for broadcast with reduced vertical resolution. Further, the rate could be set so as to provide still presentations with images changing at a slow rate, for example every 5 seconds. In addition, the interactive services could be combined with one another onto a single channel, or combined with other broadcast channels, with the basic operating characteristics described herein. For instance, instead of using the standard 48 fields for broadcast video, it is possible to utilize 6 fields per second or less in certain motion video presentations, while utilizing the remaining 54 fields for interactive fields. In other words, the full range of the increased capacity as contemplated by the present invention in producing a multi-presentation channel is to have from as few as 6 fields per second of a motion video presentation and 1 other field per second associated with other presentations. These ratios can be dynamically variable in accordance with the motion content of the video presentations, or pursuant to commands entered into the controller 64 by an operator, DVS control unit, or other controller.

The strategy for allocation of image transmission for a presentation is dynamically variable to accommodate the varying degrees of motion in presentations being transmitted; as well as providing a fair allocation of the limited, fixed channel capacity to all presentations which are transmitted through the channel. A typical strategy is to assign a specific value (such as 24 or 30 images per second) to the full motion presentation(s), assign a range of values (such as 15 to 30 images per second) to reduced motion presentations, and preempt images as required for still-frame presentations. When the channel capacity has been fully allocated, a current presentation must end or be cancelled before new presentations may be started; alternatively, the capacity must be reallocated so that all presentations may be delivered but with some at a lower image rate. A digital embodiment uses the same strategies, however, the image capacity of the channel may additionally vary with the different image compression ratios.

The signal monitoring system 74 monitors the channel output and is able to assign or override image rate assignments for each presentation through the control computer 80. Image rate assignments can be static or dynamic responsive to database criteria. The multiplexer switch 76 can automatically or manually switch between the various output signals with the signal linked to signal measurement equipment 76 to provide automatic detection and monitoring of threshold limits. The signal measurement information could be made available to the control computer 80 for further analysis activating changes to the image and channel assignments through a connection 100 to the system controller 22.

The control computer 80 could provide the system controller 22 with the information relating to the images to be transmitted for the interactive carousel of images transmitted to all terminals. When a terminal activates an identification label with the match code of a particular image, that frame store identifies the image, stores it in a memory, and then continually retransmits the stored frame at the standard television frame rate to the viewer's television receiver. In this way users can select interactive information from a predetermined group of interactive presentations (carousel) without utilizing a communications link such as a telephone connection.

Several signal monitoring controllers 80 could exist and communicate through a leased or dial-up communication line(s) 101 to monitor system activities and/or modify the images contained in the interactive carousel. Accordingly, the line connection 100 could comprise a leased line or dial-up connection enabling multiple signal monitoring subsystems 80 to communicate directly with the system controller.

The invention includes alternate methods for creating and modifying the carousel image assignment whereby users could utilize a telephone to access the DAS system or control computer and through the input of DTMF tones or voice prompts, recognizable to the system, create or make changes to a interactive image carousel.

The ability to selectively combine different video presentations on a single channel provides various capabilities. For example, interactive game shows are easily implemented. In such a situation, the full motion broadcast portion of a transmitted signal can comprise the normal game show presentation. Still images or a sequence of still images are transmitted for each possible answer that a viewer can choose in response to a question during the game show transmission. The stills are part of the interactive carousel of images combined with the broadcast video presentation comprising the game show. Thus, when the viewer chooses a particular answer, the image associated with that answer is stored and displayed to the viewer. In addition, if points are to be awarded based on the answer, the points for any given answer can be transmitted as data in the VBI of the associated image, and accumulated in a memory at the terminal, for example in a data buffer 132 of the terminal configuration illustrated in FIG. 4. The telephone interconnection further enhances the game show capabilities by providing for specific user requested information to be accessed. At the completion of the game, the viewer's total score is transmitted to the presentation system for tallying, and the highest scoring players can be acknowledged.

It will be appreciated that the present invention can be embodied in other specific forms without departing from the spirit or essential characteristics thereof. Although the illustrated embodiment has been described with reference to its operation on a single NTSC channel, the principles of the invention can be expanded over non-NTSC channels, for instance channels which will be defined under the HDTV standard.

The migration to digital television networks enables a new group of products that interface to television networks either by connecting to or replacing the digital television receivers such as digital cable converters and satellite tuners. Many of these products contain frame store and addressing capabilities providing the basic user terminal functions described previously. Examples of products that connect to networks that contain frame store capabilities include compact disk players, video game machines, personal computers, cable converters and satellite tuners.

Presentation system control of the remote terminal offers additional capabilities. For example, when interactive presentations are transmitted on multiple channels the interactive presentation system can send a command in the VBI of frames sent on one channel (channel 33) instructing the controller 104 to retune the terminal tuner 102 to a specific channel (channel 34). This command can be directly sent from the video control circuit 112 to the controller 104 or be captured in a data buffer 132 and supplied from there to the controller 104. Alternatively, the presentation system can send a single frame or field on channel 33 which visually instructs the viewer to retune the receiver to channel 34 to receive one of the multiple video presentations transmitted over that channel.

The ability to control the terminal 14 from the presentation system 10 via commands transmitted in the VBI provides other capabilities as well. For example, a user profile can be defined for each terminal which will preselect what is seen by the viewer when the television system is accessed. When the terminal is turned on, it can send a message to the presentation system 10 which identifies the terminal. In response, the presentation system can send commands via the VBI which causes the video control circuit 112 to be supplied with appropriate match codes corresponding to the stored profile for that terminal, so that the appropriate video presentation will be displayed. In this regard, different remote control units 16 for a terminal can have different respective profiles, so that the initial message sent from the terminal to the presentation system identifies the remote control unit and therefore the user as well as the terminal, so that the appropriate profile is selected.

Furthermore, if the terminal controller 104 is connected to a peripheral device such as a VCR, instructions sent from the presentation system 10 can be used to provide the viewer with any desired programming. For example, based upon demographic or other data the presentation system can send a VBI command to a certain class of subscribers to cause their video cassette recorders to record or playback a program transmitted at a certain time.

The presently disclosed embodiments are therefore considered in all respects to be illustrative and not restrictive. The scope of the invention is indicated by the appended claims rather than the foregoing description, and all modifications that come within the meaning and range of equivalence thereof are intended to be embraced therein.

What is claimed is:

1. A television system, comprising:
   a television distribution network for transmitting multiple video presentations having accompanying audio over at least one channel to a plurality of remotely located terminals each having at least one television receiver associated therewith;
   a centrally located presentation system for assembling video presentations to be transmitted by said television distribution network, said presentation system comprising:
   (1) at least one video presentation source, producing video image sequences corresponding to respective video presentations, said video image sequences each having a plurality of images;
   (2) a multiplexer which receives at least one of said video image sequences and combines it with other images to produce a transmission image sequence having a number of images, said transmission image sequence comprising a plurality of interleaved images from different video image sources;
   (3) signal encoding means to encode said transmission image sequence into a television signal complying with the television signal format of said television distribution network; and
   (4) transmitting means for transmitting said television signal over said television distribution network;
   a audio storage and output means located remotely from said presentation system for transmitting said accompanying audio for at least one of said video presentations;
   said plurality of remotely located terminals each comprising:
   (1) receiving means for receiving said television signal from said television distribution network,
   (2) decoding means to decode said television signal into said transmission image sequence,
   (3) identification means for determining whether a received image in said transmission image sequence is associated with one of said video presentations,
   (4) selection means for selecting video images associated with a specified video presentation to be displayed,
   (5) display means to transmit images selected by said selection means to said associated television receiver, and
   (6) means for retransmitting selected ones of said images to thereby present images to the receiver at the standard television rate of the receiver.

2. A television system according to claim 1, wherein said accompanying audio is transmitted over a telephone link to at least one of said remotely located terminals.

3. A television system according to claim 1, wherein said selection means selects said accompanying audio to be transmitted by said audio storage and output means.

4. A television system according to claim 1, wherein at least some of said terminals include a remote control to select a specific presentation.

5. A television system according to claim 1, wherein said audio storage and output means connects to said video presentation source to establish a connection with said presentation system.

6. A television system according to claim 1, wherein said selection means directs a connection between said audio storage and output means and said presentation system.

7. A television system according to claim 1, wherein said audio storage and output means links to at least one alternate source of accompanying audio.

8. A television system according to claim 1, wherein said audio storage and output means directs a connection between said terminal and an alternate source of accompanying audio.

9. A television system according to claim 1, wherein information contained within said video presentation directs an audio connection between at least one of said terminal and an alternate source of accompanying audio.

10. A television system according to claim 1, wherein commands in said video presentation directs said audio storage and output means to transmit said accompanying audio.

11. A television system according to claim 1, wherein commands in said video presentation directs a connection between said audio storage and output means to said presentation system.

12. A television system according to claim 1, wherein said selection means directs a connection to an alternate source of accompanying audio.

13. A television system according to claim 1, wherein said plurality of images of said transmission image sequence are analog video images.

14. A television system according to claim 1, wherein said television signal is encoded in a digital format.

15. A television system according to claim 1, wherein said plurality of images of said transmission image sequence are blocks of digitally encoded image data.

16. A television system according to claim 1, wherein each of said remotely located terminals further comprises means for sending interactive instructions to said centrally located presentation system.

17. A television system according to claim 16, wherein said means for sending interactive instructions is via a telephone network using DTMF tones.

18. A television system according to claim 16, wherein said means for sending interactive instructions is a telephone transmitting spoken interactive instructions and voice recognition means utilized to convert such spoken interactive instructions into digital data commands.

19. A television system according to claim 16, wherein said means for sending interactive instructions is via a computer connected to at least one said user terminal sending digital data commands.

20. A television system according to claim 1, wherein said video presentation is a full motion broadcast digitally stored on said presentation system.

21. A television system according to claim 1, wherein commands originating from said presentation system are sent to specific remote terminals and control peripheral devices connected to the terminal.

22. The system in claim 1, wherein at least one said video presentation is a full motion video presentation and wherein other images are interactive video sequences.

23. A television system, comprising:
- a television distribution network for transmitting multiple video presentations over at least one channel to a plurality of remotely located terminals each having at least one television receiver associated therewith;
- a centrally located presentation system for assembling video presentations to be transmitted by said television distribution network, said presentation system comprising:
  (1) at least one video presentation source, producing video image sequences corresponding to respective video presentations, said video image sequences each having a plurality of images;
  (2) an interactive video presentation source which produces interactive video images corresponding to an interactive video presentation to be transmitted by said television distribution network,
  (3) a multiplexer which receives at least one of said video image sequences and combines it with other images to produce a transmission image sequence having a number of images, said transmission image sequence comprising a plurality of interleaved images from different video image sources;
  (4) signal encoding means to encode said transmission image sequence into a television signal complying with the television signal format of said television distribution network; and
  (5) transmitting means for transmitting said television signal over said television distribution network;
- a audio storage and output means located remotely from said presentation system wherein video control information is stored with audio information;
- said plurality of remotely located terminals each comprising:
  (1) receiving means for receiving said television signal from said television distribution network,
  (2) decoding means to decode said television signal into said transmission image sequence,
  (3) identification means for determining whether a received image in said transmission image sequence is associated with one of said video presentations,
  (4) selection means for selecting video images associated with a specified video presentation to be displayed,
  (5) display means to transmit images selected by said selection means to said associated television receiver, and
  (6) means for retransmitting selected ones of said images to thereby present images to the receiver at the standard television rate of the receiver.

24. A television system according to claim 23, wherein said accompanying audio is transmitted over a telephone link to at least one of said remotely located terminals.

25. A television system according to claim 23, wherein commands from said presentation system direct a connection to an alternate source of audio.

26. A television system according to claim 23, wherein said video control information is transmitted to said interactive video presentation source.

27. A television system according to claim 23, wherein said selection means directs said video control information.

28. A television system according to claim 23, wherein commands from said video presentation system directs said video control information.

29. A television system according to claim 23, wherein commands contained within said video image sequence directs said video control information.

30. A television system according to claim 23, wherein at least some of said terminals include a remote control for selecting a specific video presentation.

31. A television system according to claim 23, wherein said audio storage and output means links to at least one alternate source of accompanying audio.

32. A television system according to claim 23, wherein said audio storage and output means directs a connection between said terminal and an alternate source of accompanying audio.

33. A television system according to claim 23, wherein each of said video presentations include accompanying audio.

34. A television system according to claim 23, wherein audio is transmitted over said television distribution network within an audio band of a television signal.

35. A television system, comprising:
- a television distribution network for transmitting multiple video presentations having accompanying audio over at least one channel to a plurality of remotely located terminals each having at least one television receiver associated therewith;
- a centrally located presentation system for producing video presentations to be transmitted by said television distribution network, said presentation system comprising:
  (1) at least one broadcast video presentation source, producing a video image sequence corresponding to a broadcast video presentation, said video image sequence having a plurality of broadcast images.
  (2) an interactive video presentation source which produces interactive video images corresponding to an interactive video presentation to be transmitted by said television distribution network,
  (3) means to combine said interactive video images and said broadcast images to produce a transmission image sequence having a number of images, said transmission image sequence comprising a plurality of interleaved images of said broadcast video images and interactive video images,
  (4) means for labelling at least some of said images;

(5) signal encoding means to encode said transmission image sequence into a television signal complying with the television signal format of said television distribution network; and (6) transmitting means for transmitting said television signal over said television distribution network;

a audio storage and output means located remotely from said presentation system for transmitting said accompanying audio for at least one of said video presentations;

said plurality of remotely located terminals each further comprising:

(1) receiving means for receiving said transmission signal from said distribution network, (2) decoding means to decode said television signal into said television image sequence, (3) identification means for determining whether a received image in said transmission image sequence contains a label, (4) selection means for selecting video images to be displayed which are associated with a label or lack thereof, and (5) capture means to store video images selected by said selection means and display means to continuously retransmit said selected images to said associated television receiver at the standard television rate of the receiver.

36. A television system, comprising:

a television distribution network for transmitting multiple video presentations over at least one channel to a plurality of remotely located terminals each having at least one television receiver associated therewith;

a centrally located presentation system for assembling video presentations to be transmitted by said television distribution network, said presentation system comprising:

(1) at least one video presentation source, producing video image sequences corresponding to respective video presentations, said video image sequences each having a plurality of images;

(2) a multiplexer which receives at least one of said video image sequences and combines it with other images to produce a transmission image sequence having a number of images, said transmission image sequence comprising a plurality of interleaved images from different video image sources;

(3) signal encoding means to encode said transmission image sequence into a television signal complying with the television signal format of said television distribution network; and (4) transmitting means for transmitting said television signal over said television distribution network;

a audio storage and output means located remotely from said presentation system wherein video control information is stored with audio information, said video control information is transmitted to said presentation system via a telephone link responsive to commands from at least one of said remotely located terminals;

said plurality of remotely located terminals each comprising:

(1) receiving means for receiving said television signal from said television distribution network, (2) decoding means to decode said television signal into said transmission image sequence, (3) identification means for determining whether a received image in said transmission image sequence is associated with one of said video presentations, (4) selection means for selecting video images associated with a specified video presentation to be displayed, (5) display means to transmit images selected by said selection means to said associated television receiver, and (6) means for retransmitting selected ones of said images to thereby present images to the receiver at the standard television rate of the receiver.

37. A method for broadcasting multiple interactive video presentations and a broadcast video presentation on a single channel of a television distribution network from an interactive television system to a plurality of terminals having television receivers associated therewith, and for providing only one of said interactive video presentations or said broadcast video presentation at a time to individual television receivers, and further having accompanying audio transmitted from a storage system located remotely from a video presentation source, comprising the steps of:

providing interactive video images and broadcast video images, each of said interactive video images having an associated identification labeled therein;

combining said interactive video images and said broadcast images to produce a transmission image sequence having a number of images including a plurality of said broadcast video images and a plurality of said interactive video images interleaved therein;

providing audio associated with some of the video images, said audio being stored in a storage system and transmitted from a location geographically remote from the source of the video images;

encoding said transmission image sequence into a television signal;

transmitting said television signal on said television distribution network to said terminals;

receiving said television signal by at least one of said terminals;

decoding said television signal into an image sequence;

identifying whether each image of said image sequence is associated with one of said interactive video image presentation or said broadcast image presentation in accordance with said labeled identification;

selecting one of said interactive video presentation or said broadcast video presentation for display on a television receiver associated with at least one of said terminals;

storing each image of said selected presentation and displaying said selected presentation on the television receiver associated with at least one of said terminals;

continuously displaying a previously received video image to the television receiver at the standard television rate; and sending interactive instructions of an operator to said interactive television system in response to said interactive instructions being sent to the terminal by the operator.

38. The method of claim 37, whereby reference information is stored with said audio, and said reference information determines the video associated with said audio.

* * * * *